(12) United States Patent
Traywick et al.

(10) Patent No.: US 8,015,945 B1
(45) Date of Patent: Sep. 13, 2011

(54) FEEDER WITH ADJUSTABLE MOUNTING APPARATUS

(75) Inventors: John Traywick, Hoover, AL (US);
Daniel Ulrich, Hamilton, OH (US);
Howard Unger, Henderson, NV (US);
Thomas Rucci, Las Vegas, NV (US)

(73) Assignee: EBSCO Industries, Inc., Birmingham, AL (US)

( * ) Notice: Subject to any disclaimer, the term of this patent is extended or adjusted under 35 U.S.C. 154(b) by 662 days.

(21) Appl. No.: 11/780,184

(22) Filed: Jul. 19, 2007

(51) Int. Cl.
*A01K 61/02* (2006.01)
*A01K 1/00* (2006.01)
(52) U.S. Cl. .................. 119/57.1; 119/57.91; 119/57.92
(58) Field of Classification Search .................. 119/52.1, 119/57.1, 57.91, 57.92, 51.13
See application file for complete search history.

(56) References Cited

U.S. PATENT DOCUMENTS

| | | | | |
|---|---|---|---|---|
| 3,038,643 | A | * | 6/1962 | Van Der Lely et al. ........ 239/683 |
| 4,497,446 | A | * | 2/1985 | van der Lely et al. ........ 239/661 |
| 5,143,289 | A | * | 9/1992 | Gresham et al. .................. 239/7 |
| 6,116,526 | A | * | 9/2000 | Bom et al. ..................... 239/682 |
| 6,375,035 | B1 | * | 4/2002 | Munroe ............................ 222/1 |
| 6,578,517 | B2 | | 6/2003 | Borries |
| 6,684,812 | B1 | | 2/2004 | Tucker |
| 7,404,376 | B2 | * | 7/2008 | Hernandez ................. 119/57.91 |

OTHER PUBLICATIONS

Instructions for Pro Hunter Feeder Kit by Moultrie Feeders (2 pages).
Instructions for Econo Plus Feeder Kit by Moultrie Feeders (2 pages).
Instructions for 30 Gallon Hanging Feeder by Moultrie Feeders (1 page).
Instructions for Economy Feeder Kit (2 pages).
Instructions for Pro Hunter Feeder Kit by Moultrie Feeders (2 pages), the products associated with these instructions were on sale at least as early as 2005 in the United States, (Jan. 16, 2006).
Instructions for Econo Plus Feeder Kit by Moultrie Feeders (2 pages), the products associated with these instructions were on sale at least as early as 2005 in the United States, (Dec. 7, 2004).
Instructions for 30 Gallon Hanging Feeder by Moultrie Feeders (1 page), the products associated with these instructions were on sale at least as early as 2005 in the United States, (Jun. 16, 2004).
Instructions for Economy Feeder Kit (2 pages), the products associated with these instructions were on sale at least as early as 2005 in the United States, (Jun. 16, 2004).

* cited by examiner

*Primary Examiner* — Joshua J Michener
*Assistant Examiner* — Valentina Xavier
(74) *Attorney, Agent, or Firm* — Smith Gambrell & Russell LLP

(57) ABSTRACT

An adjustable feeder attachable to a feed hopper includes a base plate that is connected to a motor. A series of recessions are evenly spaced along the outer edge of the base plate, and a plurality of arms are evenly disposed about outer edge of said base plate corresponding to the recessions. Each arm has a proximal end connected to the base plate and a distal end pivotable about the proximal end from a confined position proximate the base plate to an extended position away from the base plate. When the arms are in the confined position, the feeder is easily stored and transported. When the arms are in the extended position, the feeder is connectable to the bottom surface of the feed hopper, with a funnel attached to said base plate being positioned proximate a dispersing aperture in said feed hopper. Feed will travel through the funnel to a spin plate connected to the motor for the spin plate to distribute feed to the area surrounding the feeder.

19 Claims, 4 Drawing Sheets

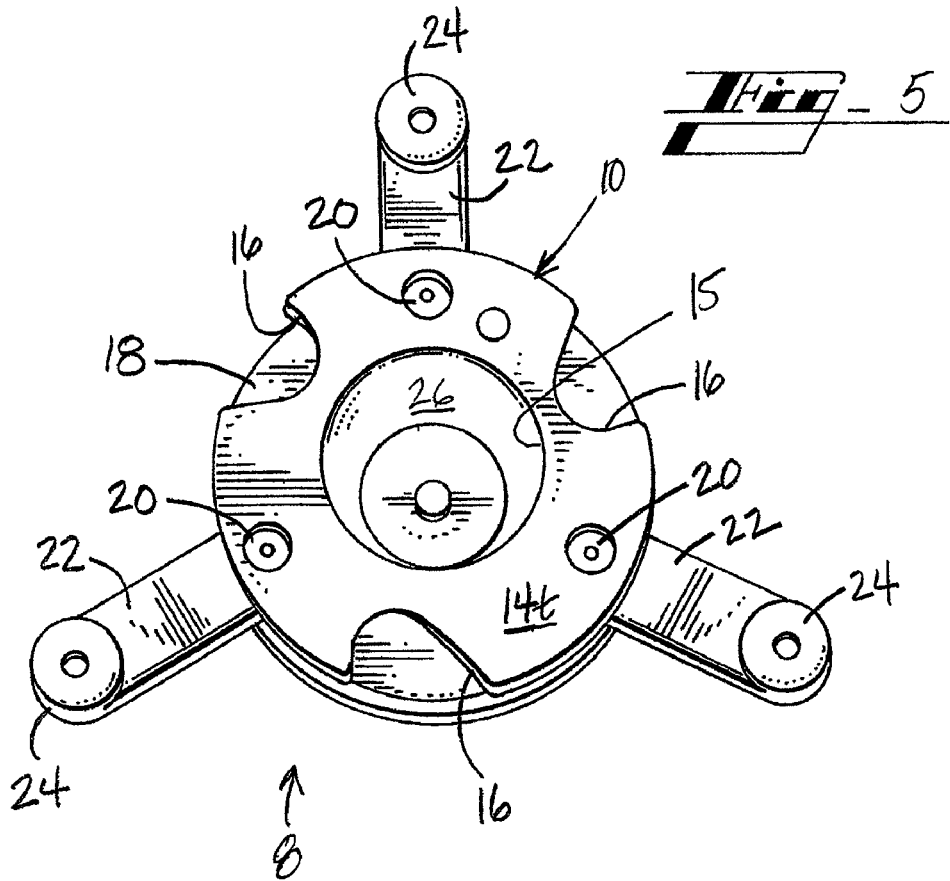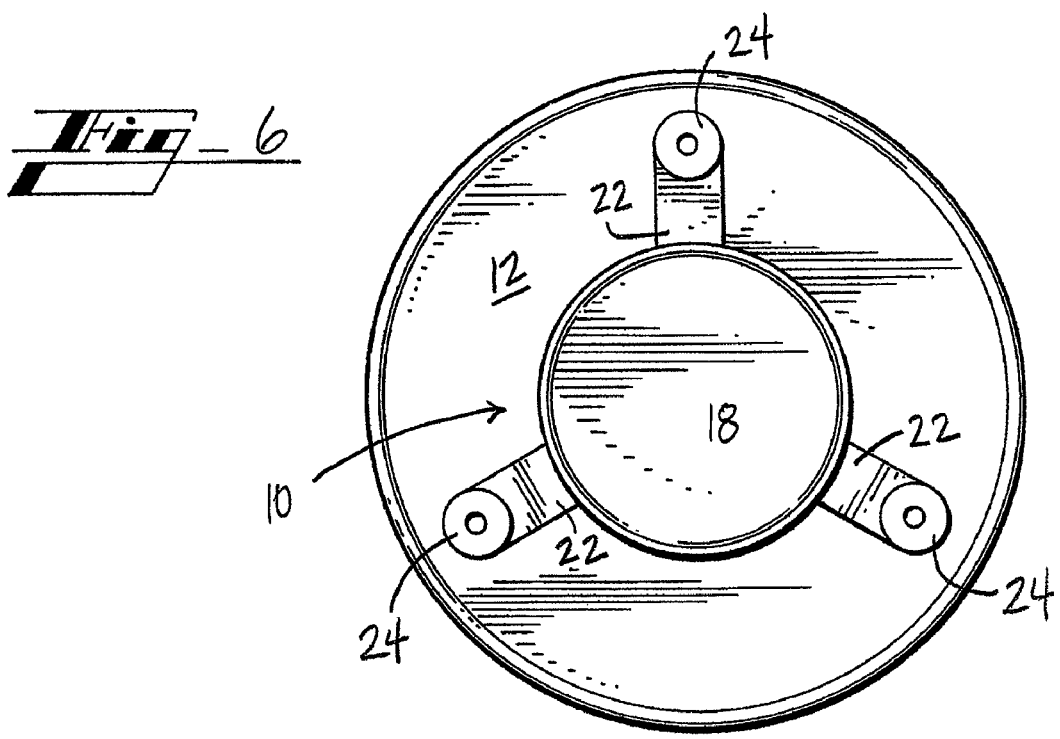

FEEDER WITH ADJUSTABLE MOUNTING APPARATUS

FIELD OF THE INVENTION

This invention relates to a feeder kit for distributing animal feed, and more specifically, to a portable feeder kit having an adjustable mounting apparatus to assist in the transportation of the feeder kit as well as the application of the feeder kit to a feed hopper.

BACKGROUND OF THE INVENTION

Animal or game feeders for use with feed hoppers are well known in the hunting industry. Such feeder kits are typically used with drum-shaped feed hoppers, with the feeder kits being attached to the bottom of a hopper near a funnel inserted through the bottom surface of the hopper. The feeder kits typically include a motor and a series of feeder legs that are rigidly connected to the motor. The feeder legs are conventionally diagonally spaced away from the motor, thereby causing the feeder to occupy a large space. As a result, the smaller footprint feeders waste a lot of space in shipping/packaging because the physical size of the feeder is so large. In addition to wasting space, these feeders are also frequently subject to damage prior to being attached to the feed hopper due to the rigid position of the legs extended away from the motor.

BRIEF SUMMARY OF THE INVENTION

An adjustable feeder kit attachable to a feed hopper is described herein. The feeder kit includes a base plate that is connected to a motor via a series of posts. A series of recessions are defined in the outer edge of the base plate, and are evenly spaced about said outer edge. A plurality of arms are evenly disposed about outer edge of said base plate corresponding to the recessions, with each arm having a proximal end and a distal end. The proximal end of each arm is connected to the base plate, while the distal end of each arm is pivotable about the proximal end from a first confined position proximate the base plate to a second extended position away from the base plate. When the base plate is in the extended position, it is connectable to the bottom surface of the feed hopper. Once connected to the feed hopper, the feeder kit is able to distribute feed from the hopper to the area surrounding the feeder.

BRIEF DESCRIPTION OF THE DRAWINGS

FIG. 5 is a top plan view of the feeder kit illustrated in FIG. 3, with the arms fully pivoted outward;

FIG. 6 is a bottom view of the feeder kit illustrated in FIG. 1; and

DETAILED DESCRIPTION OF THE INVENTION

Figure 1:
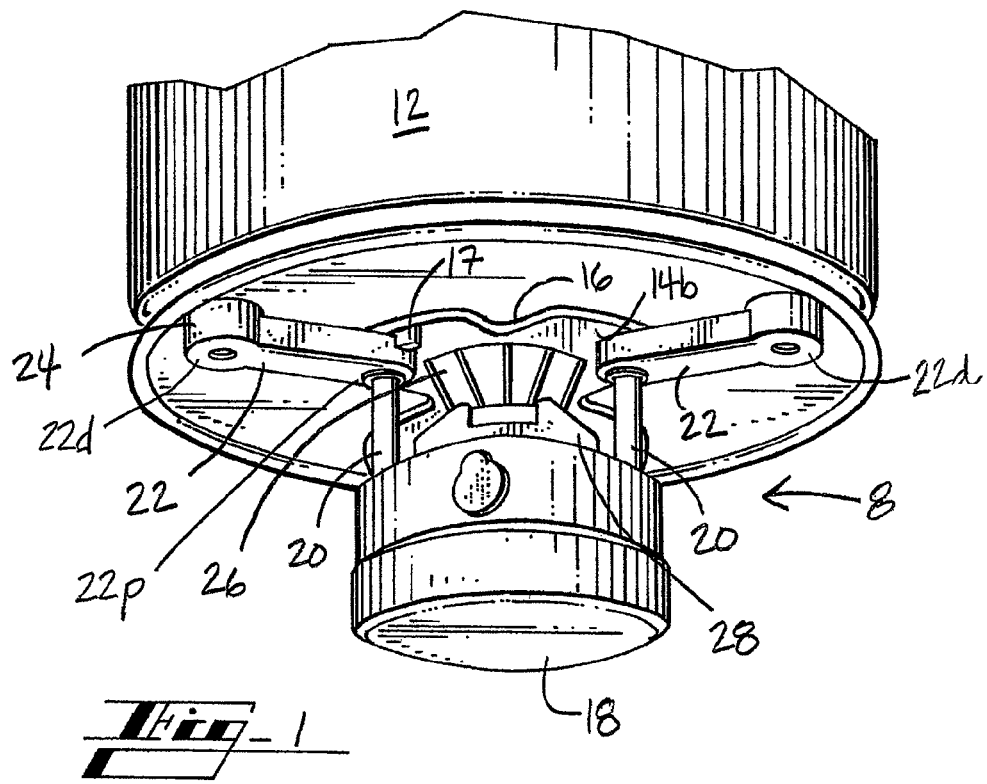
FIG. 1 is a perspective view of a feeder kit having an adjustable mounting apparatus attached to a feed hopper.
Figure 7:
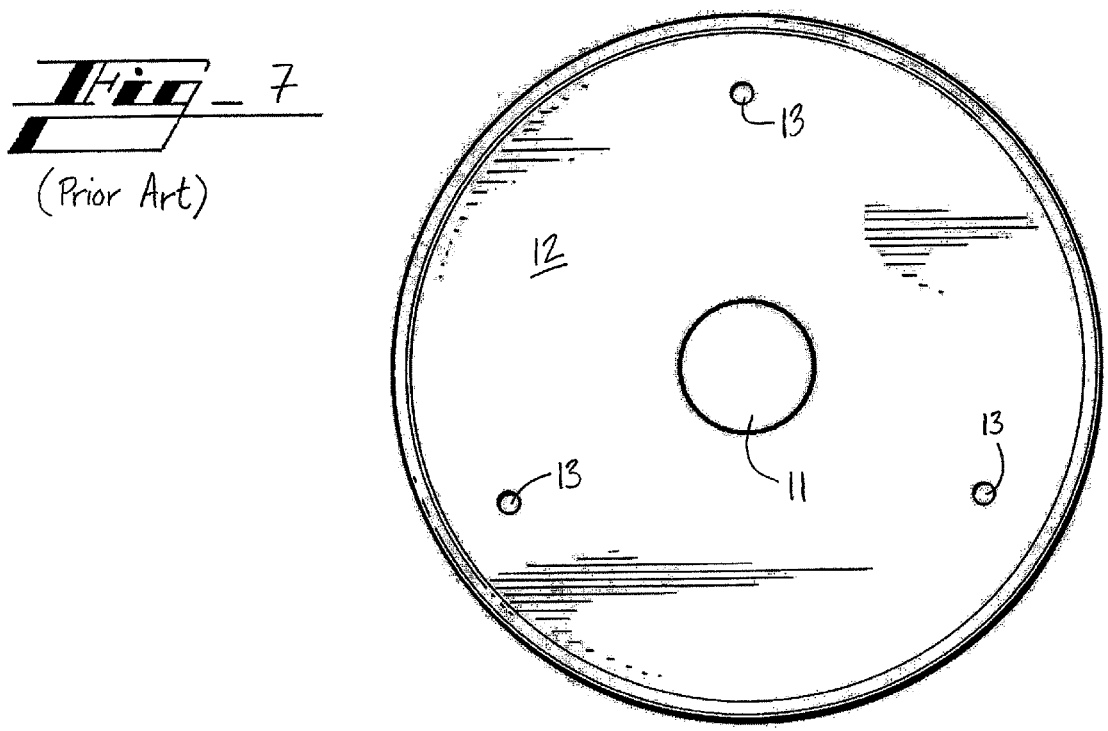
FIG. 7 is a bottom view of the feed hopper partially illustrated in FIG. 1.

Looking at FIG. 1, a feeder kit 8 having an adjustable mounting apparatus 10 attached to a feed hopper 12 is illustrated. More specifically, the mounting apparatus 10 is adjustable from a retracted or closed position to an extended or opened position to be able to attach the feeder 8 to the feed hopper 12 having a predetermined pattern of feeder leg holes 13 traversing a base surface (see FIG. 7). As a result, the size of the feeder 8 is easily minimized to ease the packing and transportation of the feeder 8, and additionally reducing cardboard and plastic costs since fewer ocean containers are needed, thus also reducing freight costs for transportation of the feeder 8. In addition, the reduced size of the feeder 8 allows dealers to be able to stock more feeders because the shelf space they require for display is now less as well.

The components of the feeder 8 is are illustrated in FIGS. 1-6. Specifically, the feeder kit 8 includes the mounting apparatus 10 connected to a motor 18 via posts 20 for distributing feed from the feed hopper 12. The mounting apparatus 10 includes a base plate 14 having a top surface 14$t$, a bottom surface 14$b$, and an outer edge 14$e$ between the top surface 14$t$ and the bottom surface 14$b$. The base plate 14 includes a series of independent recessions 16 distributed along the outer edge 14$e$, with the recessions 16 being evenly spaced about the base plate 14. A number of arms 22 are connected to the base plate 14 as well, with each arm 22 having a proximal end 22$p$ and a distal end 22$d$. The arms 22 are evenly disposed about the outer edge 14$e$ of the base plate 14, with the proximal end 22$p$ of each arm 22 pivotally connected to the posts 20 proximate the bottom surface 14$b$ of the base plate 14 (see FIGS. 1 and 2) so that the distal end 22$d$ of the arm 22 may rotate from a first confined position (shown in FIG. 3) to a second extended position (shown in FIG. 5) about said proximal end 22$p$.

Figure 2:
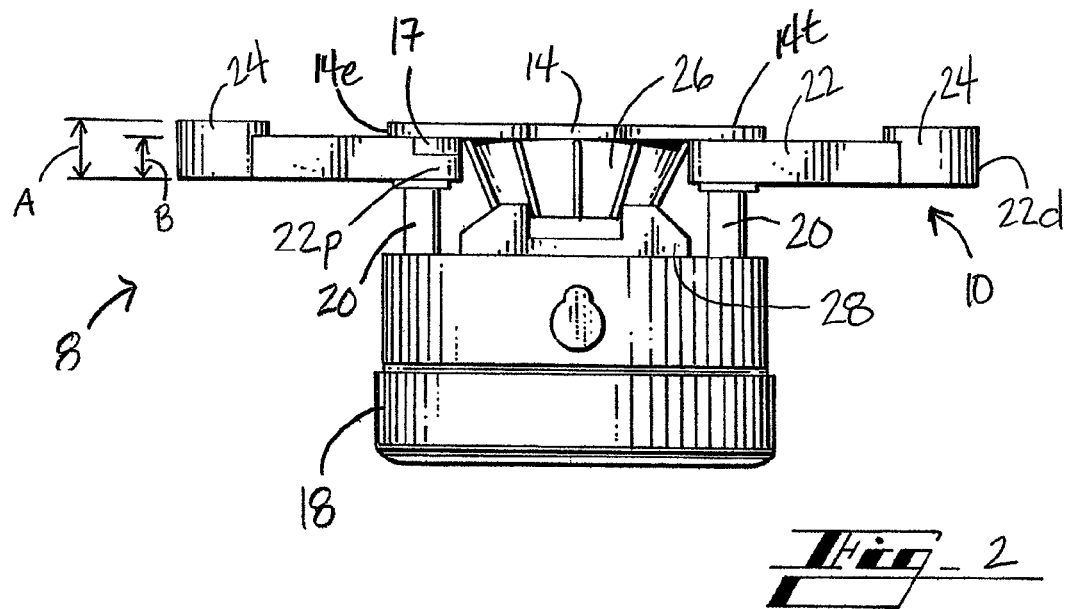
FIG. 2 is a side elevational view of the feeder kit.

Referring to FIG. 2, the distal end 22$d$ of each arm 22 includes a connector 24 that is to be connected to the base plate 14. The connector 24 has a first or connector depth A, while the arm 22 has a second or arm depth B. In the embodiment illustrated in the figures, the connector depth A is equivalent to the arm depth B plus the distance between the top surface 14$t$ and the bottom surface 14$b$ of the base plate 14. Furthermore, referring to FIG. 3, the shape of the connector 24 is complimentary to the shape of the recession 16 in the base plate 14, such that when the arm 14 is in the confined position, the connector 24 will snugly abut the corresponding recession 16 and the uppermost surface of the connector 14 will be level with the top surface 14$t$ of the base plate 14. As shown in the embodiment illustrated in FIGS. 1-6, the connector 24 is substantially round, and the recession 16 has a substantially arcuate inner surface, to provide the desirable complimentary fit. However, it is foreseen that variations of these illustrated shapes or new shapes could achieve the desired complimentary fit as well.

The mounting apparatus 10 of the feeder 8 additionally includes a plurality of arm abutment locks 17. The arm abutment locks 17 are connected with the bottom surface 14$b$ of the base plate 14, with each arm abutment lock 17 positioned proximate a corresponding arm 22 on a side of the arm 22 opposite of its corresponding recession 16. As a result, when the user pivots or rotates the arm 14 from its recessed or confined position in the recession 16, the distal end 22$d$ of the arm 22 will move toward the arm abutment lock 17 corresponding to the arm 22. The position of the arm abutment lock 17 will prevent rotation of the arm 22 at a position so that the connector 24 is farthest away from the center of the base plate 14.

At the center of the base plate 14 is a central aperture 15 that traverses the base plate 14, with a funnel or chute 26 integrally connected to the bottom surface 14$b$ of the base plate 14 proximate the central aperture 15 to direct feed from the feed hopper 12 toward a spin plate 28. In the embodiment illustrated in FIG. 2, the funnel 26 has a frustoconical shape, which will centrally direct feed from the feed hopper 12 onto the spin plate 28 for distribution of the feed into the area surrounding the feeder 8. The spin plate 28, which may include a fin or channel, acts as an agitator for distributing the feed. The spin plate 28 is connected to the motor 18, which periodically controls the distribution of the feed as desired by the user. More specifically, the motor 18 is connected to a power source, such as a battery, via a controller or circuit, such that the motor will selectively cause the spin plate 28 to operate and distribute food. For example, the controller or control circuit may be a conventional timer or photosensor that determines when the spin plate 28 should operate.

Figure 3:
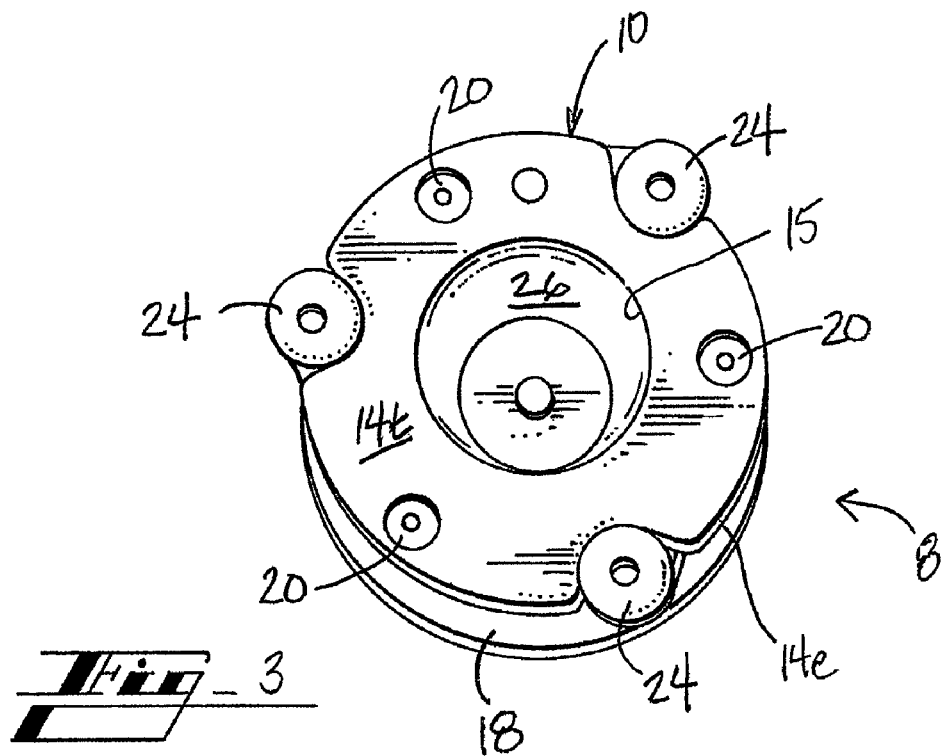
FIG. 3 is a top plan view of the feeder kit.
Figure 4:
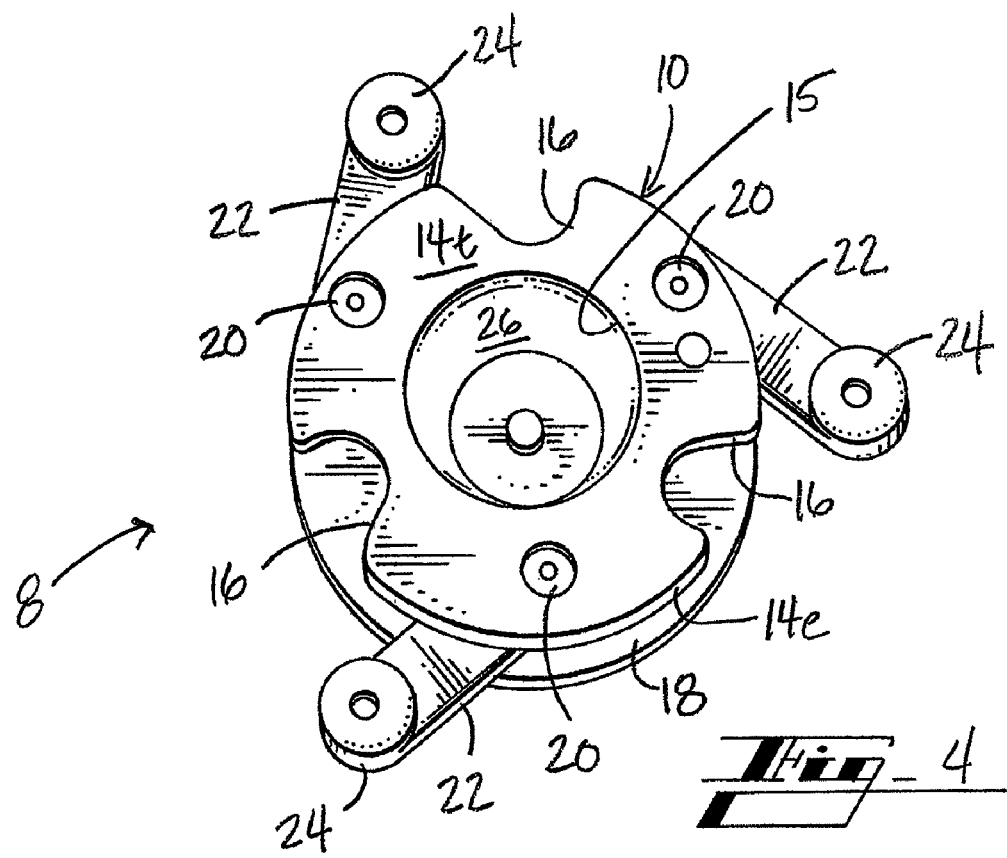
FIG. 4 is a top plan view of the feeder kit illustrated in FIG. 3, with the arms partially pivoted outward.

In operation, the feeder 8 will be stored and shipped in the retracted position shown in FIG. 3. By reducing the overall package size of the finished product, the product is more easily transported and cardboard and plastic container costs are reduced since fewer containers are needed to ship the smaller products. Correspondingly, freight costs are reduced and dealers are able to stock more feeders 8 than with conventional feeder designs because the required shelf space for storage is reduced. Once the user receives the feeder 8 for use in the field, the user will pivot the arms 22 into the extended position abutting the arm abutment locks 17, such that the position of the connectors 24 will correspond with the position of the feeder leg holes 13 of the feed hopper 12.

Once the mounting apparatus 10 is in the extended position, the user will be able to fasten each connector 24 to one of the corresponding feeder leg holes 13 using a bolt, screw or similar connecting member (not illustrated). Once the mounting apparatus 10 is affixed to the hopper 12, the top surface 14t of the base plate 14 will substantially abut the bottom surface of the hopper 12, and the position of the central aperture 15 of the base plate 14 will correspond with a dispersing aperture 11 of the hopper 12, such that feed will be able to fall from the feed hopper 12 into the funnel 28 of the feeder 8. As a result, when the spin plate 28 is rotated by the motor 18, feed will descend from the hopper 12, through the dispersing aperture 11 and central aperture 15, into the funnel 26 and onto the spin plate 28 to be distributed to the area surrounding the feeder 8.

Having thus described exemplary embodiments of the present invention, it should be noted by those skilled in the art that the within disclosures are exemplary only and that various other alternatives, adaptations, and modifications may be made within the scope of the present invention. Accordingly, the present invention is not limited to the specific embodiments as illustrated herein, but is only limited by the following claims.

What is claimed is:

1. A portable feeder attachable to a feed hopper comprising:
   a base plate having a top surface, a bottom surface, and an outer edge between said top surface and said bottom surface;
   a series of recessions in said base plate spaced about said outer edge;
   a motor connected to said base plate; and
   a funnel connected to said bottom surface of said base plate between said base plate and said motor;
   a plurality of arms, each arm having a proximal end and a distal end; said arms being disposed about outer edge of said base plate, said distal end of each said arm being pivotable about said proximal end from a first confined position to a second extended position;
   wherein said arms are connected to said feed hopper with said top surface of said base plate abutting said feed hopper when said feeder is attached to the feed hopper.

2. The feeder as described in claim 1 wherein said distal end of each arm includes a connector.

3. The feeder as described in claim 2, wherein each said arm has a predetermined arm depth, and said connector has a predetermined connector depth, said connector depth being greater than said arm depth.

4. The feeder as described in claim 1, further comprising an agitator connected to said motor, said agitator positioned between said funnel and said motor.

5. The feeder as described in claim 4, wherein said agitator comprises a spin plate connected to said motor.

6. The feeder as described in claim 1 further comprising a plurality of arm abutment locks, each arm abutment lock positioned proximate one of said corresponding arms.

7. A feeder kit assembly for use with a feeder hopper having a bottom surface with a predetermined pattern of connecting holes traversing therethrough, said feeder kit assembly comprising:
   a base plate having an upper surface, a lower surface, and an outer edge between said upper surface and said lower surface, said base plate including a series of notches disposed about said outer edge of said base plate;
   a series of arms disposed about said base plate proximate said outer edge, each arm including a proximal end connected to said base plate and a distal end displaceably engaging one of said notches;
   a motor connected to said base plate; a funnel connected to said lower surface of said base plate between said base plate and said motor;
   said arms pivotable between a closed position with each said distal end engaging said corresponding notch and an opened position with said distal end extended away from said corresponding notch to be connected with the connecting holes in the feed hopper.

8. The feeder kit assembly of 7, further comprising a plurality of locking members evenly distributed about said lower surface of said base plate, said locking members positioned proximate a corresponding arm opposite said corresponding notch.

9. The feeder kit assembly of 8 wherein said distal end of each arm includes a connecting member and means for joining said connecting member with said base plate.

10. The feeder kit assembly as described in claim 9, wherein each said arm has a predetermined arm depth and said connector has a predetermined connector depth, said connector depth being greater than said arm depth.

11. The feeder kit assembly as described in claim 9, wherein the position of each said connector corresponds with one of the connecting holes when said arms are in said opened position.

12. The feeder kit assembly as described in claim 7, further comprising a frustoconical chute integrally connected to said bottom surface of said base plate between said base plate and said motor.

13. The feeder kit assembly as described in claim 12, further comprising means for distributing animal feed from said frustoconical chute, said distribution means positioned between said frustoconical chute and said motor.

14. The feeder kit assembly as described in claim 13 wherein said distribution means comprises a spin plate with at least one fin rising from said spin plate.

15. A portable feeder attachable to a feed hopper to distribute feed from the feed hopper comprising:

a base plate having a top surface, a bottom surface, and an outer edge between said top surface and said bottom surface;

a series of recessions in said base plate displaced about said outer edge;

motor means for agitating feed for distribution from the feed hopper, said motor means coupled with said base plate;

a funnel connected to said bottom surface of said base plate between said base plate and said motor means; and a plurality of arms, each arm having a proximal end and a distal end; said arms being disposed about outer edge of said base plate, said distal end of each said arm being pivotable about said proximal end from a first confined position to a second extended position;

wherein at least one of said arms is connected to said feed hopper with said top surface of said base plate adjacent said feed hopper when said feeder is attached to the feed hopper.

16. The feeder as described in claim 15 wherein said distal end of each arm includes a connector.

17. The feeder as described in claim 15 further comprising an agitator connected to said motor means and positioned adjacent said funnel.

18. The feeder as described in claim 17, wherein said agitator comprises a spin plate connected to said motor means.

19. The feeder as described in claim 15 further comprising a plurality of arm abutment locks, each arm abutment lock positioned proximate one of said corresponding arms.

\* \* \* \* \*